US009583928B2

(12) United States Patent
Kawamura (10) Patent No.: US 9,583,928 B2
(45) Date of Patent: Feb. 28, 2017

(54) MOUNTING STRUCTURE OF ELECTRONIC COMPONENT

(71) Applicant: Yazaki Corporation, Tokyo (JP)

(72) Inventor: Yukihiro Kawamura, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/822,181

(22) Filed: Aug. 10, 2015

(65) Prior Publication Data

US 2016/0050779 A1 Feb. 18, 2016

(30) Foreign Application Priority Data

Aug. 12, 2014 (JP) ................................ 2014-164379

(51) Int. Cl.
*H05K 5/00* (2006.01)
*H02G 3/18* (2006.01)
*B60R 16/023* (2006.01)

(52) U.S. Cl.
CPC ............ *H02G 3/18* (2013.01); *B60R 16/0238* (2013.01); *B60R 16/0239* (2013.01)

(58) Field of Classification Search
CPC .... H05K 5/0256; H05K 5/0221; H01H 85/20; H01R 13/684; H01R 13/629
USPC ................................................. 361/728–732
See application file for complete search history.

(56) References Cited

U.S. PATENT DOCUMENTS

| 5,859,580 | A | * | 1/1999 | Hashizawa | H01R 13/68 337/255 |
| 6,062,914 | A | * | 5/2000 | Fasano | H01H 71/08 361/634 |
| 7,948,353 | B2 | * | 5/2011 | Deno | H01H 85/547 337/187 |
| 9,320,162 | B2 | * | 4/2016 | Kawamura | H05K 5/0217 |
| 2008/0242150 | A1 | * | 10/2008 | Chikamatsu | H01H 85/0208 439/620.3 |
| 2013/0043971 | A1 | * | 2/2013 | Chen | H01H 85/2045 337/205 |
| 2015/0382497 | A1 | * | 12/2015 | Kawamura | B60R 16/0238 361/728 |

(Continued)

FOREIGN PATENT DOCUMENTS

JP 2009-261119 A 11/2009

*Primary Examiner* — Hung S Bui
(74) *Attorney, Agent, or Firm* — Sughrue Mion, PLLC (57) ABSTRACT

A mounting structure of an electronic component includes an electronic component, a housing member, a counterpart terminal, and at least one locking mechanism. The electronic component includes: an electronic component main body; a housing formed by assembling a casing member in which a chamber for the electronic component main body is formed and a base member to which the electronic component main body is attached; and a terminal exposed from the chamber to outside of the housing. The housing member includes a housing space including: a first chamber that accommodates the housing; and a second chamber that accommodates a terminal. The counterpart terminal is fitted into the second chamber and electrically coupled to the terminal. The locking mechanism maintains the accommodation state of the electronic component to the housing member by engaging a first engaging part and a second engaging part.

10 Claims, 7 Drawing Sheets

(56) References Cited

U.S. PATENT DOCUMENTS

| | | | | |
|---|---|---|---|---|
| 2016/0049779 A1* | 2/2016 | Kawamura | ............ | H02G 3/081 |
| | | | | 174/541 |
| 2016/0049780 A1* | 2/2016 | Kawamura | .............. | H02G 3/18 |
| | | | | 174/541 |
| 2016/0050777 A1* | 2/2016 | Kawamura | .......... | H05K 5/0217 |
| | | | | 174/549 |

* cited by examiner

MOUNTING STRUCTURE OF ELECTRONIC COMPONENT

CROSS-REFERENCE TO RELATED APPLICATIONS

The present application claims priority to and incorporates by reference the entire contents of Japanese Patent Application No. 2014-164379 filed in Japan on Aug. 12, 2014.

BACKGROUND OF THE INVENTION

1. Field of the Invention

The present invention relates to a mounting structure of an electronic component.

2. Description of the Related Art

In conventional electronic components, a portion or the whole of an electronic component is accommodated in a chamber of a housing member as a mounting destination, and a terminal electrically coupled to its electronic component main body is inserted into a terminal metal fitting of the housing member, whereby the electronic component is mounted onto the housing member. For example, in the following technology disclosed in Japanese Patent Application Laid-open No. 2009-261119, a relay terminal is inserted into a terminal metal fitting of a terminal insertion hole of a relay block (a housing member) while a portion of the relay (a cover of a main body of the relay) as an electronic component is fitted into a fitting part of the relay block, whereby the relay is mounted on the relay block.

Electronic components are not always used on a static object being stationary and may be used on a dynamic object that is moving such as a vehicle. To such an electronic component used on a dynamic object, vibrations generated by the dynamic object itself or resulting from an input to the object are transmitted. The transmitted vibrations may vibrate the electronic component, which may lead to a contact failure between a terminal and a terminal metal fitting.

SUMMARY OF THE INVENTION

The present invention aims to provide a mounting structure of an electronic component capable of preventing a contact failure resulting from vibrations.

In order to achieve the above mentioned object, a mounting structure of an electronic component according to one aspect of the present invention includes the electronic component configured to include an electronic component main body, a housing formed by assembling a casing member in which a chamber for the electronic component main body is formed and a base member to which the electronic component main body is attached, and a terminal exposed from the chamber to outside of the housing while maintaining an electrical connection state between the terminal and the electronic component main body; a housing member configured to include a housing space for the electronic component, the housing space including a housing chamber that accommodates the housing, and a terminal chamber that accommodates a terminal of the electronic component; a counterpart terminal configured to be fitted into the terminal chamber and electrically coupled to the terminal in association with accommodation of the electronic component into the housing space; and at least one locking mechanism configured to maintain an accommodation state of the electronic component with respect to the housing member, the electronic component being accommodated in the housing member by engaging a first engaging part provided to the base member and a second engaging part provided to the housing member one another.

Herein, it is desirable that the base member includes a platy base to which the electronic component main body is attached, the first engaging part is provided on a side surface of the base or a wall surface of a wall provided upright from an end portion of the base, and the second engaging part is provided on a wall of the housing member opposed to the side surface or the wall surface of the base.

Further, it is desirable that the first engaging part is a protrusion that protrudes toward the second engaging part, and the second engaging part is a hole or a recess into which the protrusion is inserted.

Further, it is desirable to further include a foreign-matter infiltration suppressing structure configured to include a groove-shaped first fitting part formed on one connected portion out of connected portions between the casing member and the base member, and a second fitting part formed on the other connected portion and being fitted into the first fitting part.

In order to achieve the above mentioned object, a mounting structure of an electronic component according to another aspect of the present invention includes the electronic component configured to include an electronic component main body, a housing in which the electronic component main body is mounted on any one of a plurality of structural members, and the structural members are assembled so as to form a chamber for the electronic component main body in the housing, and a terminal exposed from the chamber of the housing to outside of the housing while maintaining an electrical connection state between the terminal and the electronic component main body; a housing member configured to include a housing space for the electronic component, the housing space including a housing chamber that accommodates the housing, and a terminal chamber that accommodates a terminal of the electronic component; a counterpart terminal configured to be fitted into the terminal chamber and electrically coupled to the terminal in association with accommodation of the electronic component into the housing space; and at least one locking mechanism configured to maintain an accommodation state of the electronic component with respect to the housing member, the electronic component being accommodated in the housing member by engaging a first engaging part provided to the structural member to which the electronic component main body is attached and a second engaging part provided to the housing member one another.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of a mounting structure of an electronic component according to the present invention will be described in detail with reference to accompanying drawings. The present invention is not limited to the embodiment.

Embodiment

An embodiment of the mounting structure of an electronic component according to the present invention will be described with reference to FIGS. 1 to 7. The mounting structure includes an electronic component and a housing member of the electronic component.

An electronic component according to the embodiment of the present invention includes an electronic component main body; a housing in which the electronic component main body is mounted onto any one of a plurality of structural members and the structural members are assembled so as to form a chamber for the electronic component main body in the housing; and a terminal as an electric coupling part exposed from the chamber of the housing to the outside of the housing while maintaining the electrical connection state between the terminal and the electronic component main body. Examples of such an electronic component include a relay, a fuse, and the like.

The housing member according to the embodiment of the present invention includes at least one housing space for an electronic component. The housing space includes a housing chamber for accommodating a housing of an electronic component and a terminal chamber for accommodating a terminal of the electronic component. In the housing member, an electric coupling part is provided. The electric coupling part in the housing member is a part (a counterpart terminal) that engages with a terminal of the electronic component in association with accommodation of the electronic component into the housing space, thereby establishing electrical connection with each other. The counterpart terminal is fitted into the terminal chamber. To the counterpart terminals, a wire or a wire harness is coupled directly or through other electric coupling part. With the housing member, at least one electronic part is interposed between a power supply (a secondary battery) and at least one electronic device through the wire or the like, whereby electric power from the power supply to the electronic device can be supplied to the electronic part. For example, if the electronic component is mounted onto a vehicle such as an automobile, the housing member is fixed to an automobile structure in an engine compartment or a passenger compartment of the automobile, for example.

Between the terminal of the electronic component and the counterpart terminal of the housing member, one of them applies a pressing force to the other, thereby maintaining engagement state therebetween. This operation allows the electronic component to be retained in the housing member because of the pressing force when the electronic component is accommodated in the housing member. Between the electronic component and the housing member, to strengthen the engagement state, at least one locking mechanism that maintains the accommodation state of the electronic component accommodated in the housing member is provided. The locking mechanism includes a first engaging part provided to a structural member to which the electronic component main body is attached; and a second engaging part provided to the housing member. The first engaging part and the second engaging part are engaged with each other, thereby maintaining the accommodation state of the electronic component.

The first engaging part is provided to at least one of the four side surfaces of a quadrate or rectangular platy structural member (a base) in the housing. In this case, the second engaging part is provided on a wall of the housing member opposed to the side surface. The first engaging part is provided to a wall surface of a wall provided upright from at least one of the four end portions of the structural member (the base), for example. In this case, the second engaging part is provided on a wall of the housing member opposed to the wall surface.

The housing member may be used standalone as a part for accommodating at least a single electronic component. Alternatively, the housing member may be used as an assembly in which a plurality of such single parts are assembled, or may be used in such a way that at least one such single part is mounted onto a main part (hereinafter referred to as "main part"). These housing members are known as electrical junction boxes if used in a vehicle. An electrical junction box is a part that accommodates therein at least one electronic part. Known examples of such accommodated electronic parts include electronic components such as a relay and a fuse as described above, and a connector for wiring (e.g., a relay connector or a branching connector). Some of electrical junction boxes may accommodate an electronic control unit of a vehicle. Such an electrical junction box may be referred to as a relay box, a fuse box, or a junction box.

Some of electrical junction boxes include at least one housing space for accommodating an electronic part, the housing space being formed in a frame serving as a main part, for example. If the above-described electronic component is mounted in the housing space, the frame serves as the above-described housing member. Other electrical junction boxes include a frame serving as a main part; and at least one block fixed to a certain mounting place in the frame. On the block, at least one housing space for an electronic part is provided. If the above-described electronic component is mounted in the housing space, the block serves as the above-described housing member. Still other electrical junction boxes include a frame to which the block is mounted having at least one housing space for the electronic part. In this case, if the above-described electronic component is mounted in the housing space, this frame also serves as the above-described housing member in addition to the block. On the block, the above-described at least one housing member may be mounted.

Hereinafter described are specific examples of the mounting structure of the electronic component according to the present embodiment.

Figure 1:
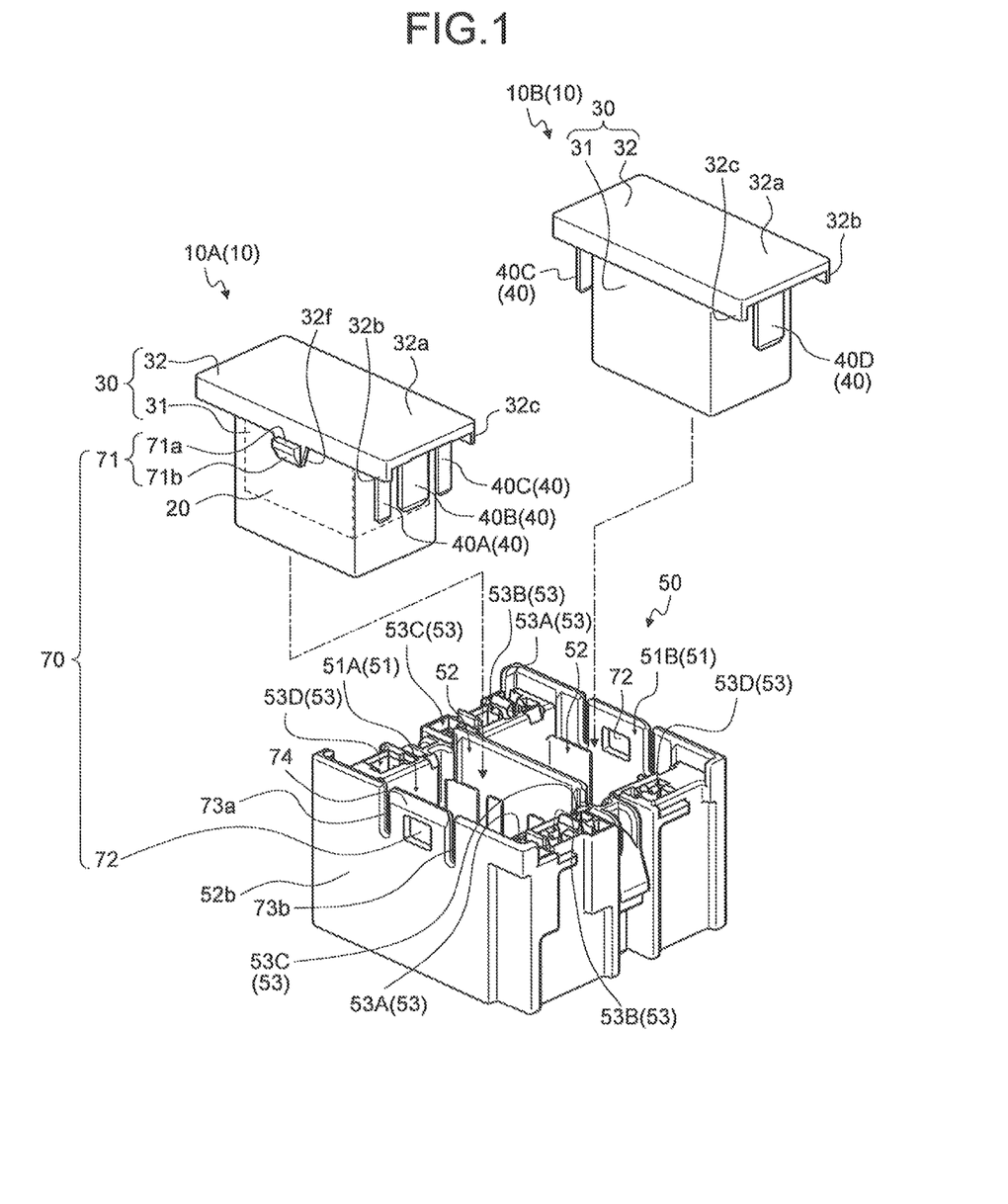
FIG. 1 is an exploded perspective view of an electronic component before being mounted and a housing member according to an embodiment of the present invention.
Figure 2:
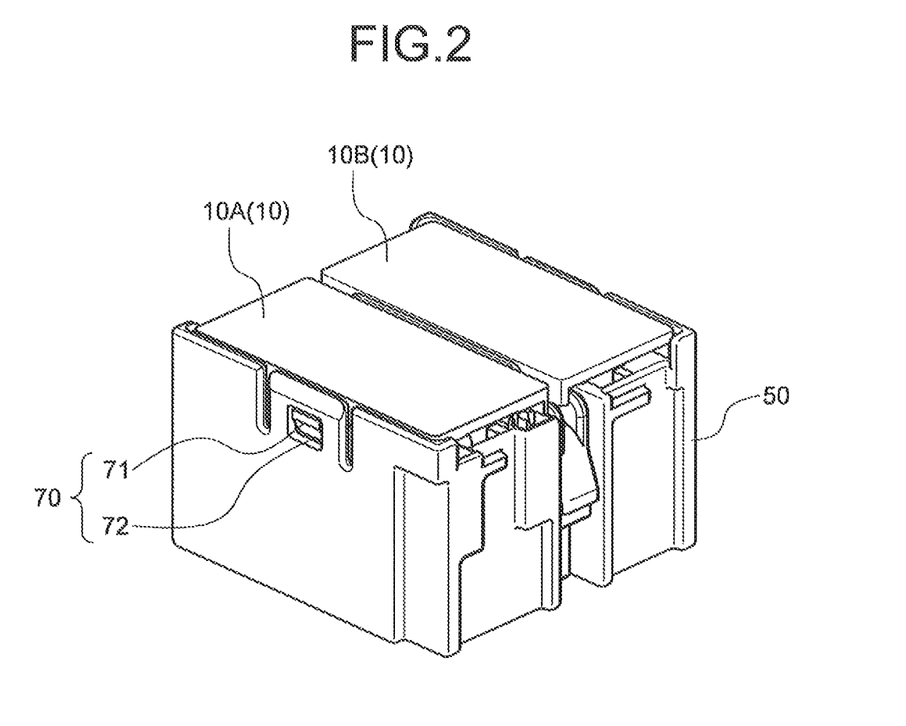
FIG. 2 is a perspective view of the electronic component after being mounted and the housing member according to the embodiment.

The reference numerals 10 and 50 illustrated in FIGS. 1 and 2 refer to an electronic component and a housing member according to the present embodiment, respectively. In this example, a relay is presented as an example of the electronic component 10.

The electronic component 10 includes an electronic component main body 20, a housing 30 accommodating the electronic component main body 20, and a terminal 40 electrically coupled to the electronic component main body 20 and disposed outside of the housing 30.

The electronic component main body 20 in this example is a main body of a relay and includes a coil and other various types of parts. The electronic component main body 20 illustrated in the drawings is in a box shape for convenience of illustration.

Figure 3:
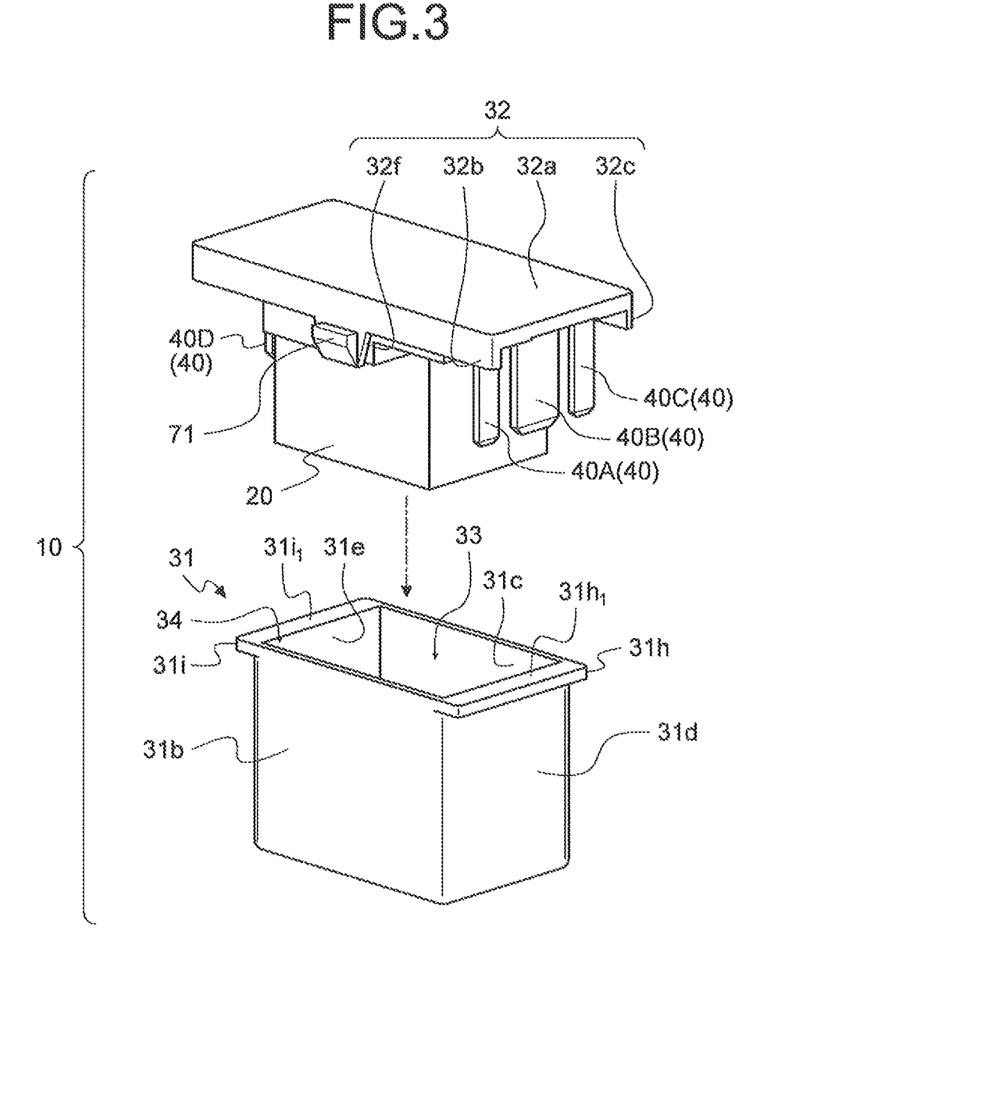
FIG. 3 is an exploded perspective view of the electronic component before being mounted according to the embodiment.
Figure 4:
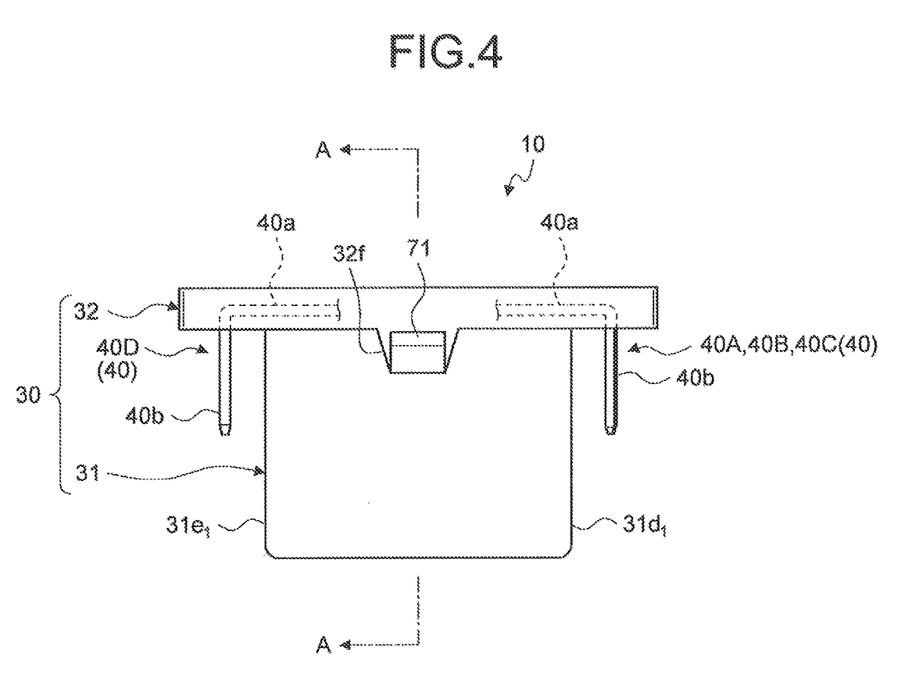
FIG. 4 is a front view of the electronic component after being mounted according to the embodiment.

The housing 30 in this example includes, as illustrated in FIG. 3, two structural members: a casing member 31 serving as a first structural member; and a base member 32 serving as a second structural member. In the housing 30, the casing member 31 and the base member 32 are assembled and integrated as illustrated in FIGS. 1 and 4, thereby providing a chamber 33 for the electronic component main body 20. Inside of the chamber 33, the electronic component main body 20 is fixed to either the casing member 31 or the base member 32. In this example, as illustrated in FIG. 3, the electronic component main body 20 is attached to the base member 32.

The casing member 31 and the base member 32 are made of insulating high polymer materials such as a synthetic resin. When being assembled, the casing member 31 and the base member 32 are fixed by an engaging mechanism (not illustrated). The engaging mechanism includes lock parts (e.g., a nail and a groove) provided on and between the casing member 31 and the base member 32, respectively.

Figure 5:
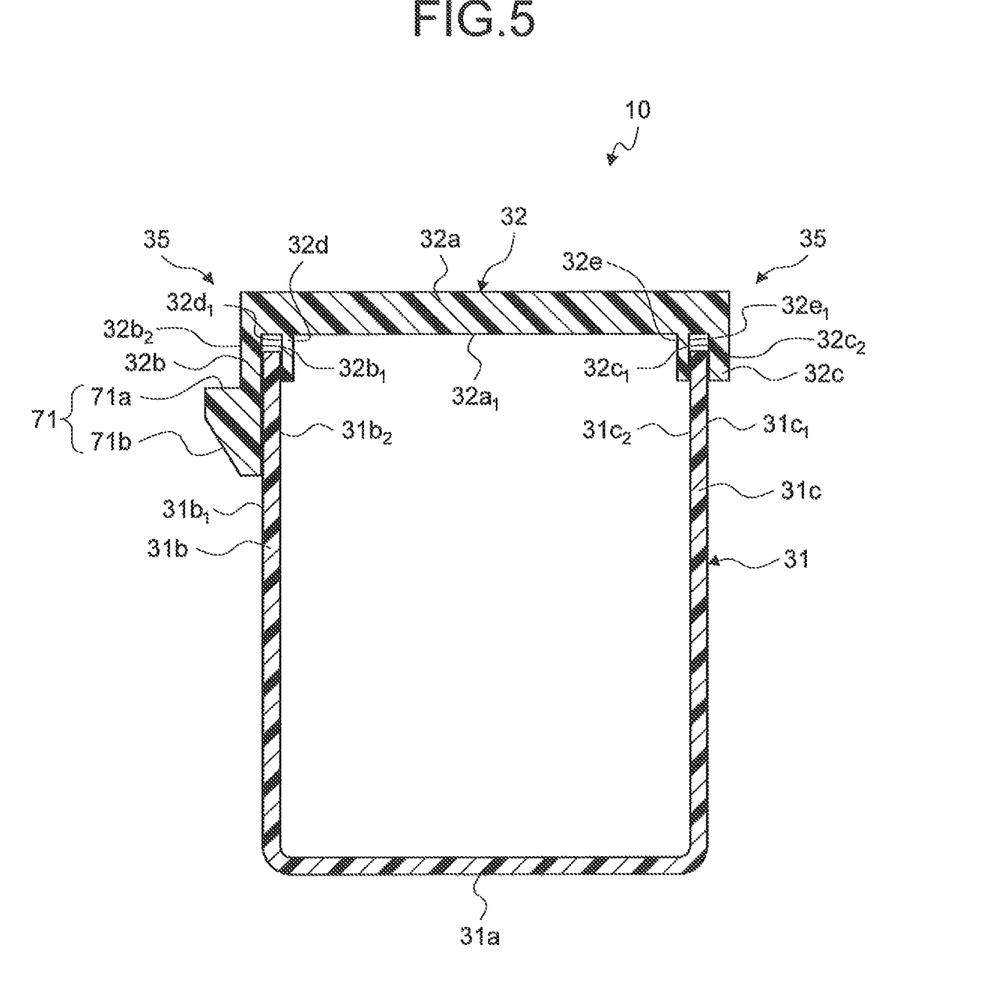
FIG. 5 is a cross-sectional view along the line A-A illustrated in FIG. 4 according to the embodiment.

The casing member 31 includes a quadrate or rectangular bottom 31a (FIG. 5) and walls 31b to 31e (FIG. 3) provided upright from the four sides of the bottom 31a, respectively. In the casing member 31, the internal space enclosed with the bottom 31a and the walls 31b to 31e is utilized as the chamber 33 for the electronic component main body 20. Also in the casing member 31, a quadrate or rectangular opening 34 is provided and utilized as an insertion position for the electronic component main body 20 into the chamber 33. The casing member 31 in this example includes the rectangular platy bottom 31a, and from the four sides of the bottom 31a, the walls 31b to 31e extend in the vertical direction, respectively, whereby the casing member 31 is formed as a rectangular parallelepiped box. The opening 34 is thus formed rectangle by the end portions of the respective walls 31b to 31e in their extending direction. In FIG. 5, the electronic component main body 20 is excluded for convenience of illustration.

The base member 32 includes a platy base 32a in a quadrate or rectangular shape. In the base 32a, a plane $32a_1$ (FIG. 5) that is one of the two planes of the base 32a can cover the opening 34 of the casing member 31, and thus is utilized as a cover member. To the plane $32a_1$ and the like that covers the opening 34, the electronic component main body 20 is fixed. The base 32a in this example is formed in a larger rectangle than the opening 34 so that a peripheral portion of four sides is formed when the base 32a covers the opening 34. The electronic component main body 20 is attached within an area surrounded by the peripheral portion.

In the base member 32, out of the four sides (the four end portions) of the base 32a, on a pair of opposing two sides (two end portions), a first wall 32b and a second wall 32c are provided, respectively. In this example, on the end portions of the two long sides of the base 32a, the first wall 32b and the second wall 32c are provided, respectively. The first wall 32b and the second wall 32c are provided upright, viewed from the base 32a, toward the side at which the electronic component main body 20 is disposed, respectively. The first wall 32b and the second wall 32c in this example extend in the vertical direction relative to the plane $32a_1$ of the base 32a. The cross section of the base member 32 cut along its vertical direction and the short side direction (one widthwise direction) has a U-shape. The first wall 32b and the second wall 32c cover the respective ends on the opening 34 side of the wall 31b and the wall 31c of the casing member 31 from outside. Accordingly, the inner wall surface $32b_1$ of the first wall 32b faces an outer wall surface $31b_1$ on the end portion on the opening 34 side of the wall 31b in a manner parallel with each other. The inner wall surface $32c_1$ of the second wall 32c faces the outer wall surface $31c_1$ on the end portion on the opening 34 side of the wall 31c in a manner parallel with each other. Hereinafter, the long side direction may be referred to as "the other widthwise direction". The first wall 32b may cover the entire outer wall surface $31b_1$ of the wall 31b, and the second wall 32c may cover the entire outer wall surface $31c_1$ of the wall 31c.

The terminals 40 are electric coupling parts that electrically couple the electronic component main body 20 in the housing 30 to later-described terminals 61 of the housing member 50. The terminals 40 are included in a metallic bus bar electrically coupled to the electronic component main body 20 and are platy male terminals. The terminals 40 in this example are disposed on a pair of opposing two sides on the other side (the side of the short sides) where the first wall 32b and the second wall 32c are not provided, viewed from the base member 32. In other words, the terminals 40 in this example are disposed outside of the walls 31d and 31e viewed from the casing member 31. At the outside of the wall 31d, three terminals 40 are provided as a terminal 40A, a terminal 40B, and a terminal 40C. At the outside of the wall 31e, one terminal 40D is provided as a terminal 40.

These terminals 40 each include a first extending part 40a extending along the plane $32a_1$ of the base 32a; and a second extending part 40b extending along an outer wall surface of the casing member 31 (FIG. 4). The first extending part 40a guides the corresponding terminal 40 from inside of the housing 30 to the outside. Specifically, the first extending part 40a extends the corresponding terminal 40 from the side of the electronic component main body 20 toward the outside of the housing 30 along the plane $32a_1$ of the base 32a in the long side direction (the other widthwise direction). The first extending part 40a is interposed between the end portion of the opening 34 side of the casing member 31 and the base 32a of the base member 32. The second extending part 40b extends from the end portion of the corresponding first extending part 40a as a starting point in the extending direction, along the outer wall surface of the casing member 31 in the vertical direction (in the orthogonal direction relative to the plane $32a_1$ of the base 32a). The extending direction of the second extending part 40b is the insertion direction of the terminal 40 into the terminal (the male terminal) 61. Between the second extending part 40b and the outer wall surface of the casing member 31, a space is provided.

In the terminals 40A, 40B, and 40C, the respective first extending parts 40a are disposed at the side of the wall 31d, and from the end portions of the respective first extending parts 40a, the second extending parts 40b extend along the outer wall surface $31d_1$ of the wall 31d. The second extending parts 40b are disposed with spaces interposed therebetween in the direction orthogonal to the extending direction and in the direction along the outer wall surface $31d_1$ of the wall $31d$. In the terminal $40D$ disposed on the other side, the first extending part $40a$ is disposed at the side of the wall $31e$, and from the end portion of the first extending part $40a$, the second extending part $40b$ extends along the outer wall surface $31e_1$ of the wall $31e$. The terminal $40D$ is disposed in substantially the center of the base $32a$ in the short side direction. The terminals $40A$, $40B$, $40C$, and $40D$ are disposed so as to be present within a rectangular parallelepiped formed by projecting the plane $32a_1$ of the base $32a$ of the base member $32$ in the orthogonal direction to the plane $32a_1$ and in the extending direction of the second extending part $40b$.

The housing member $50$ is made of insulating high polymer materials such as a synthetic resin, and includes a housing space $51$ for the electronic component $10$. The housing member $50$ has the housing space $51$ for each of the electronic components $10$. The housing member $50$ in this example includes, as illustrated in FIG. 1, a housing space $51A$ accommodating an electronic component $10A$; and a housing space $51B$ accommodating an electronic component $10B$. In this example, the electronic component $10A$ and the electronic component $10B$ are the same parts. Accordingly, the housing space $51A$ and the housing space $51B$ have the same shape and size with each other. The housing space $51$ ($51A$ and $51B$) include a first chamber (a first cavity) $52$ serving as a housing chamber accommodating the housing $30$ (specifically, the casing member $31$) of the electronic component $10$ ($10A$ and $10B$); and second chambers (second cavities) $53$ serving as terminal chambers accommodating the terminals $40$ of the electronic component $10$ ($10A$ and $10B$).

Figure 6:
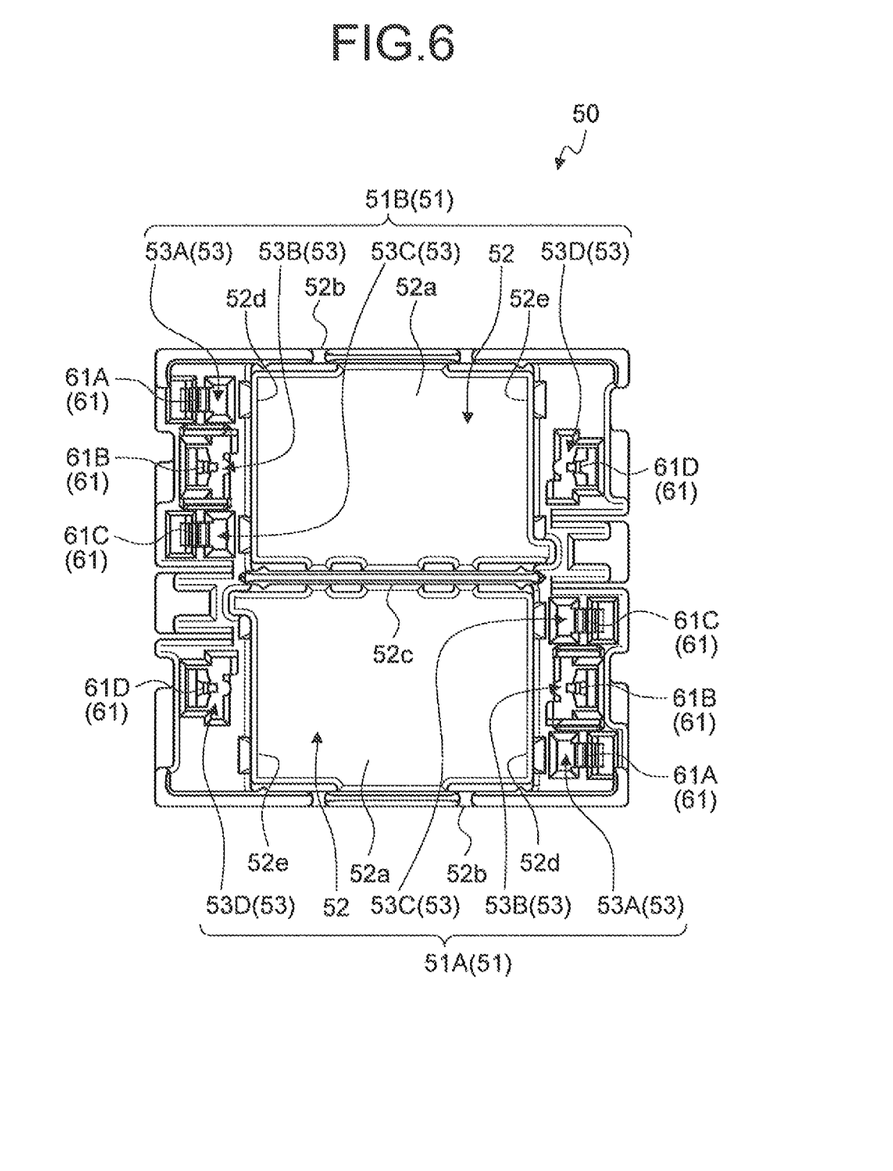
FIG. 6 is a top view of the housing member according to the embodiment.

The first chamber $52$ is a space having an equivalent shape and size to that of the casing member $31$ of the electronic component $10$. The space is formed with, as illustrated in FIG. 6, a quadrate or rectangular bottom $52a$ and walls $52b$ to $52e$ provided upright from the four sides of the bottom $52a$, respectively. The first chamber $52$ in this example includes the rectangular platy bottom $52a$, and from the four sides of the bottom $52a$, the walls $52b$ to $52e$ extend in the vertical direction, respectively, whereby the first chamber $52$ is formed as a rectangular parallelepiped space. In the first chamber $52$, an opening is formed with the end portions of the walls $52b$ to $52e$ in the extending direction. The opening is utilized as an insertion position for the casing member $31$. In this example, the wall $52c$ of the first chambers $52$ is shared by the housing spaces $51A$ and $51B$.

When the casing member $31$ is accommodated, wall surfaces of the wall $52b$ face not only the wall surface $31b_1$ of the wall $31b$ in the casing member $31$ but also a wall surface $32b_2$ (FIG. 5) of the first wall $32b$ in the base member $32$ (FIG. 2) in a manner parallel with each other. When the casing member $31$ is accommodated, the wall surfaces of the wall $52c$ face not only the wall surface $31c_1$ of the wall $31c$ in the casing member $31$ but also a wall surface $32c_2$ (FIG. 5) of the second wall $32c$ in the base member $32$ (FIG. 2) in a manner parallel with each other.

The second chambers $53$ each include at least two openings and an internal space communicating with the openings. In the internal space, each of the terminals $40$ of the electronic component $10$ is accommodated. The insertion direction of the terminals $40$ into the second chambers $53$ is the same as the insertion direction of the casing member $31$ into the first chamber $52$. One of the two openings in each of the second chambers $53$ serves as an insertion position for each of the terminals $40$ when the electronic component $10$ is accommodated into the housing space $51$.

Into the second chambers $53$, terminals $61$ serving as electric coupling parts are fitted. The terminals $61$ are counterpart terminals to be electrically coupled to the terminals $40$ of the electronic component $10$. The terminals $61$ in this example are female terminals into which the terminals $40$ of the electronic component $10$ are inserted. The terminals $61$ are each formed in a spring shape having an elastic force, for example, although not illustrated, which can retain the inserted terminals $40$ by the pressing force (a contact pressure) corresponding to the elastic force. To each of the terminals $61$, a wire or a wire harness (not illustrated) is coupled directly or through other electric coupling part. The wire or the like is guided from the other opening of the second chamber $53$ to the outside of the second chamber $53$.

The second chamber $53$ is provided for each of the terminals $40$ of the electronic component $10$. In this example, the electronic component $10$ includes the four terminals $40A$ to $40D$, and thus, as illustrated in FIGS. 1 and 6, four second chambers $53A$ to $53D$ are provided for accommodating the respective terminals. The second chambers $53A$ to $53C$ are disposed on the outside of the wall $52d$ viewed from the first chambers $52$. The second chamber $53D$ is disposed on the outside of the wall $52e$ viewed from the first chamber $52$. Into the four second chambers $53A$ to $53D$, terminals $61A$ to $61D$ are fitted, respectively.

Between the above-described electronic component $10$ and housing member $50$, when the electronic component $10$ is accommodated in the housing space $51$ of the housing member $50$, as described above, the terminals $40$ are retained by the terminals $61$ of the second chambers $53$, whereby the electronic component $10$ is retained in the housing space $51$ of the housing member $50$. However, if the electronic component $10$ is mounted on a dynamic object such as a vehicle through the housing member $50$, for example, the electronic component $10$ may vibrate because the vibration generated by the dynamic object itself or resulting from an input to the object are transmitted thereto. This vibration may cause some deviation of accommodation state in the housing space $51$, which may lead to a contact failure between any one of the terminals $40$ and the corresponding terminals $61$.

To avoid this issue, between the electronic component $10$ and the housing member $50$, at least one locking mechanism $70$ described above is provided (FIG. 2) for maintaining the accommodation state of the electronic component $10$ relative to the housing member $50$. The locking mechanism $70$ is provided between the base member $32$ that is the structural member to which the electronic component main body $20$ is attached and the housing member $50$. The locking mechanism $70$ includes a first engaging part $71$ provided to the base member $32$; and a second engaging part $72$ provided to the housing member $50$. The first engaging part $71$ and the second engaging part $72$ are engaged with each other, thereby maintaining the accommodation state of the electronic component $10$ relative to the housing member $50$. The locking mechanism $70$ in this example is provided between the first wall $32b$ of the base member $32$ and the wall $52b$ of the housing member $50$. The following describes an example of the combination of the first engaging part $71$ and the second engaging part $72$. The combination, however, is not limited to the example structure, and may be any structure as long as it has a function of the above-described locking mechanism.

The first engaging part $71$ is provided on the outer wall surface $32b_2$ of the first wall $32b$. The second engaging part $72$ is provided on an inner wall surface of the wall $52b$ (the side of the first chamber $52$) opposed to the wall surface $32b_2$. The first wall 32b in this example includes, in its center in the long side direction, a protruding wall 32f protruding in the insertion direction of the electronic component 10 into the housing member 50 (FIGS. 1 and 4). The first engaging part 71 in this example is provided on the protruding wall 32f. The first engaging part 71 is a protrusion protruding toward the inner wall surface of the wall 52b. By contrast, the second engaging part 72 is a hole or a recess into which the first engaging part 71 is inserted. The second engaging part 72 in this example has a quadrate or rectangular hole.

Figure 7:
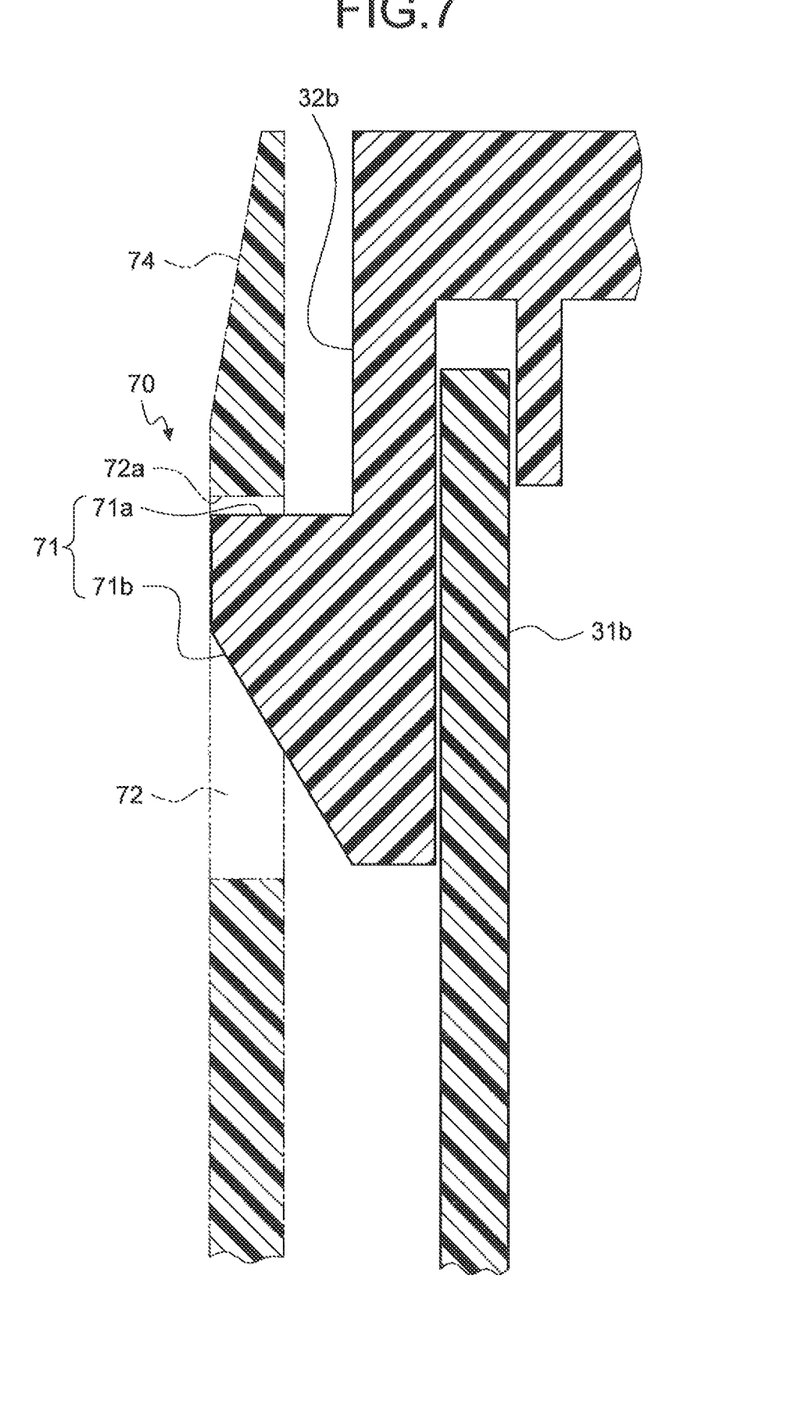
FIG. 7 is a cross-sectional view along the line A-A illustrated in FIG. 4 and a partial enlarged view of a locking mechanism according to the embodiment.

The first engaging part 71 utilizes its rear end portion in the insertion direction of the electronic component 10 into the housing member 50 as a lock part 71a to the second engaging part 72 (FIG. 1). The lock part 71a has a plane orthogonal to the insertion direction, which is opposed to a wall surface 72a of the second engaging part 72 when the first engaging part 71 is inserted into the second engaging part 72 (FIG. 7). This structure enables the lock part 71a to be locked by the wall surface 72a of the second engaging part 72 even if the electronic component 10 accommodated in the housing member 50 receives a force in the direction in which the electronic component 10 drops from the housing member 50. As described above, the locking mechanism 70 can prevent deviation of the accommodation state of the electronic component 10 relative to the housing space 51, thereby maintain the electrical connection state between the terminals 40 of the electronic component 10 and the terminals 61 of the housing member 50. In this example, the clearance between the lock part 71a and the wall surface 72a is reduced to the extent not to obstruct the insertion of the first engaging part 71 into the second engaging part 72.

The first engaging part 71 has, on its tip side in the insertion direction of the electronic component 10 into the housing member 50, an inclined plane 71b having a protruding amount decreasing along the insertion direction. On the wall 52b, notches 73a and 73b are provided for tilting the second engaging part 72 toward the direction apart from the first engaging part 71 until the insertion of the first engaging part 71 into the second engaging part 72 is completed. The notches 73a and 73b are extended from the opening side of the housing space 51 to the insertion direction of the electronic component 10. The second engaging part 72 is disposed between the notches 73a and 73b. In this structure, when the electronic component 10 is inserted to be accommodated, a slope 74 enclosed with the notches 73a and 73b is moved and tilted, together with the second engaging part 72, by being pressed by the inclined plane 71b of the first engaging part 71. After the first engaging part 71 is inserted into the second engaging part 72, the slope 74 returns to the original position. During the insertion, the protruding wall 32f where the first engaging part 71 is disposed also tilts toward the opposite direction from the tilt direction of the slope 74. After the first engaging part 71 is inserted into the second engaging part 72, the protruding wall 32f also returns to the original position. This mounting structure can therefore prevent the locking mechanism 70 from obstructing an insertion operation of the electronic component 10 into the housing member 50. The slope 74 and the protruding wall 32f are used for releasing a locked state of the locking mechanism 70. An operator can release the locked state maintained by the lock part 71a by tilting the slope 74 in the releasing direction, for example. An operator can also release the locked state maintained by the lock part 71a by pressing and moving the protruding wall 32f together with the first engaging part 71 in the releasing direction, for example. The mounting structure thus enables attaching and detaching operations of the electronic component 10 to and from the housing member 50.

In the electronic component 10, if vibrations are transmitted, the assembly (the assembly of the electronic component main body 20, the base member 32, and the terminals 40) that is heavier than the casing member 31 is more likely to swing. The assembly thus receives a larger force than a force applied to the casing member 31. However, the mounting structure of the electronic component 10 according to the present embodiment has the locking mechanism 70 between the structural member where the electronic component main body 20 is attached (the base member 32) and the housing member 50. The mounting structure can therefore continue to maintain the locked state of the locking mechanism 70 for longer time than it does when the locking mechanism 70 is provided between a light structural member (the casing member 31) without the electronic component main body 20 being attached and the housing member 50, even if the assembly receives a force caused by vibrations transmitted to the electronic component 10. The mounting structure can prevent the deviation of the accommodation state of the electronic component 10 relative to the housing space 51, thereby preventing a contact failure between the terminals. As described above, the mounting structure has high resistance to vibrations.

The housing 30 includes a foreign-matter infiltration suppressing structure 35 for preventing foreign matters such as liquids and dust from entering the chamber 33 from outside. The foreign-matter infiltration suppressing structure 35 is provided to connected portions of the casing member 31 and the base member 32, and includes a groove-shaped first fitting part formed on one connected portion; and a second fitting part formed on the other connected portion, the second fitting part fitted into the first fitting part. In this example, the foreign-matter infiltration suppressing structure 35 includes the end portion on the opening 34 side of the casing member 31 (the second fitting part) and a groove-shaped fitting part into which the end portion is fitted (the first fitting part). In this example, the groove-shaped fitting part is provided to the base member 32, but it may be provided to the casing member 31 alternatively.

For example, between the end portion on the opening 34 side of the wall 31b of the casing member 31 and the first wall 32b of the base member 32, as described above, the end portion has the wall surface $31b_1$ and the first wall 32b has the wall surface $32b_1$ opposed in parallel with each other. In the housing 30 according to the present embodiment, the space between the wall surfaces $31b_1$ and $32b_1$ is reduced to the extent not to obstruct the assembly of the casing member 31 and the base member 32, as illustrated in FIG. 5. The space is preferably reduced to the extent that the wall surfaces $31b_1$ and $32b_1$ are abutted to each other unless the assembly of the casing member 31 and the base member 32 is obstructed. On the base member 32, a wall surface is formed that sandwiches the end portion on the opening 34 side of the wall 31b with the inner wall surface $32b_1$ of the first wall 32b. This additional wall surface is provided as a wall surface $32d_1$ that is one wall surface of the wall 32d provided upright from the plane $32a_1$ of the base 32a. The wall 32d extends in the long side direction (the other widthwise direction) of the base 32a, and the wall surface $32d_1$ faces an inner wall surface $31b_2$ on the end portion on the opening 34 side of the wall 31b in a manner parallel with each other. The space between the wall surfaces $31b_2$ and $32d_1$ is reduced to the extent not to obstruct the assembly of the casing member 31 and the base member 32. The space is preferably reduced to the extent that the wall surfaces $31b_2$ and $32d_1$ are abutted to each other unless the assembly of the casing member 31 and the base member 32 is obstructed.

In this example, a groove enclosed with the first wall $32b$, the wall $32d$, and the base $32a$ is utilized as the above-described groove-shaped fitting part. The fitting part is formed so that the entire of the end portion on the opening 34 side of the wall $31b$ in the long side direction (the other widthwise direction) is sandwiched between the wall surfaces $32b_1$ and $32d_1$ as whole as possible. In this manner, in this example, the fitting part of the base member 32 and the end portion on the opening 34 side of the wall $31b$ in the casing member 31 forms the foreign-matter infiltration suppressing structure 35.

In the example illustrated in FIG. 5, a space is provided between the end surface of the end portion on the opening 34 side of the wall $31b$ in the extending direction and the bottom surface of the fitting part (the plane $32a_1$ of the base $32a$). In this example, to enhance the effect of suppressing foreign-matter infiltration, the end portion on the opening 34 side of the wall $31b$ is preferably extended toward the bottom surface of the fitting part until it comes into contact with the bottom surface to the maximum. The reason is that such a shape of the wall $31b$ enlarges the area where the wall surfaces $31b_1$ and $32b_1$ are opposed to each other and the area where the wall surfaces $31b_2$ and $32d_1$ are opposed to each other. This structure can extend a transfer path for foreign matters from the outside to the inside the housing 30, thereby making it more difficult for foreign matters to enter through areas between the wall surfaces.

In addition, between the end portion on the opening 34 side of the wall $31c$ of the casing member 31 and the second wall $32c$ of the base member 32, as described above, the end portion has the wall surface $31c_1$ and the second wall $32c$ has the wall surface $32c_1$ opposed in parallel with each other. In the present embodiment, therefore, the foreign-matter infiltration suppressing structure 35 is formed in the same manner as above at the position at which the wall surfaces $31c_1$ and $32c_1$ are opposed to each other. The space between the wall surfaces $31c_1$ and $32c_1$ is reduced to the extent not to obstruct the assembly of the casing member 31 and the base member 32. The space is preferably reduced to the extent that the wall surfaces $31c_1$ and $32c_1$ are abutted to each other unless the assembly of the casing member 31 and the base member 32 is obstructed. From the plane $32a_1$ of the base $32a$, a wall $32e$ extending in the long side direction (the other widthwise direction) of the base $32a$ is provided upright. The wall $32e$ includes a wall surface $32e_1$ facing the inner wall surface $31c_2$ on the end portion on the opening 34 side of the wall $31c$ in a manner parallel with each other. The space between the wall surfaces $31c_2$ and $32e_1$ is reduced to the extent not to obstruct the assembly of the casing member 31 and the base member 32. The space is preferably reduced to the extent that the wall surfaces $31c_2$ and $32e_1$ are abutted to each other unless the assembly of the casing member 31 and the base member 32 is obstructed.

In this example, the groove enclosed with the second wall $32c$, the wall $32e$, and the base $32a$ is also utilized as the above-described groove-shaped fitting part. The fitting part is formed so that the entire of the end portion on the opening 34 side of the wall $31c$ in the long side direction (the other widthwise direction) is sandwiched between the wall surfaces $32c_1$ and $32e_1$ as whole as possible. In this manner, in this example, the fitting part of the base member 32 and the end portion on the opening 34 side of the wall $31c$ in the casing member 31 forms the foreign-matter infiltration suppressing structure 35.

Also in the foreign-matter infiltration suppressing structure 35, in the example illustrated in FIG. 5, a space is provided between the end surface of the end portion on the opening 34 side of the wall $31c$ in the extending direction and the bottom surface of the fitting part (the plane $32a_1$ of the base $32a$). In this example, to enhance the effect of suppressing foreign-matter infiltration and because of the same reason as that for the wall $31b$ side, the end portion on the opening 34 side of the wall $31c$ is preferably extended toward the bottom surface of the fitting part until it comes into contact with the bottom surface to the maximum.

In this example, the first wall $32b$, the second wall $32c$, and the two walls $32d$ and $32e$ are provided upright from the plane $32a_1$ of the base $32a$, thereby forming the groove-shaped fitting parts. However, the fitting parts may be grooves formed on the plane $32a_1$ of the base $32a$.

In the casing member 31 in this example, flanges $31h$ and $31i$ are provided on the end portions on the opening 34 side of the walls $31d$ and $31e$, respectively (FIG. 3). The flanges $31h$ and $31i$ include planes $31h_1$ and $31i_1$ opposed in parallel with the plane $32a_1$ of the base $32a$, which are also opposed to the second extending parts $40b$ of the terminals 40 (40A, 40B, 40C, and 40D) when the casing member 31 is assembled to the base member 32. Although not illustrated herein, in the flange $31h$, a wall extending toward the plane $32a_1$ of the base $32a$ is preferably provided at a position other than the position where the plane $31h_1$ is opposed to the second extending parts $40b$ of the terminals 40A, 40B, and 40C. The wall between the second extending part $40b$ of the terminal 40A and the second extending part $40b$ of the terminal 40B; and the wall between the second extending part $40b$ of the terminal 40B and the second extending part $40b$ of the terminal 40C are both preferably formed in such a shape that fills at least one portion therebetween as much as possible. The wall between the second extending part $40b$ of the terminal 40A and the end portion on the opening 34 side of the wall $31b$ is preferably formed in such a shape that fills the portion therebetween as much as possible. The wall between the second extending part $40b$ of the terminal 40C and the end portion on the opening 34 side of the wall $31c$ is also preferably formed in such a shape that fills the portion therebetween as much as possible. On the plane $32a_1$ of the base $32a$, a groove-shaped fitting part is preferably formed into which the additionally provided wall is fitted. In addition, in the housing 30, a wall is preferably provided also on the flange $31i$ where the terminal 40D is disposed, based on the same concept as that of the flange $31h$. Furthermore, a groove-shaped fitting part into which the wall is fitted is preferably provided on the plane $32a_1$ of the base $32a$. In this manner, in the housing 30, the foreign-matter infiltration suppressing structure 35 can be provided in areas where the terminals 40 are provided. In the areas, groove-shaped fitting parts may be provided to the flanges $31h$ and $31i$, and walls that are fitted into the fitting parts may be provided on the plane $32a_1$ of the base $32a$.

In the housing 30, the above-described foreign-matter infiltration suppressing structure 35 can prevent foreign matters from entering the chamber 33 from outside. The mounting structure according to the present embodiment can therefore improve resistance to the above-described vibrations and enhance effect of suppressing foreign-matter infiltration of the chamber 33.

The mounting structure of an electronic component according to an embodiment of the present invention has a locking mechanism between a structural member (a base member) where an electronic component main body is attached and a housing member. The mounting structure can therefore continue to maintain the locked state of the locking mechanism for longer time than it does when a similar locking mechanism is provided between a structural member without the electronic component main body being attached and the housing member, when vibrations are transmitted to the electronic component. This structure can prevent a contact failure between terminals.

The present invention aims to provide a mounting structure of an electronic component capable of preventing a contact failure resulting from vibrations.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mounting structure of an electronic component, comprising:
    the electronic component configured to include
        an electronic component main body,
        a housing formed by assembling a casing member in which a chamber for the electronic component main body is formed and a base member to which the electronic component main body is attached, and
        a terminal exposed from the chamber to outside of the housing while maintaining an electrical connection state between the terminal and the electronic component main body;
    a housing member configured to include a housing space for the electronic component, the housing space including a housing chamber that accommodates the housing, and a terminal chamber that accommodates a terminal of the electronic component;
    a counterpart terminal configured to be fitted into the terminal chamber and electrically coupled to the terminal in association with accommodation of the electronic component into the housing space; and
    at least one locking mechanism configured to maintain an accommodation state of the electronic component with respect to the housing member, the electronic component being accommodated in the housing member by engaging a first engaging part provided to the base member and a second engaging part provided to the housing member one another, wherein
    the housing is configured to surround all sides of the electronic component main body.

2. The mounting structure of the electronic component according to claim 1, wherein
    the base member includes a platy base to which the electronic component main body is attached,
    the first engaging part is provided on a side surface of the base or a wall surface of a wall provided upright from an end portion of the base, and
    the second engaging part is provided on a wall of the housing member opposed to the side surface or the wall surface of the base.

3. The mounting structure of the electronic component according to claim 2, wherein
    the first engaging part is a protrusion that protrudes toward the second engaging part, and
    the second engaging part is a hole or a recess into which the protrusion is inserted.

4. The mounting structure of the electronic component according to claim 2, further comprising:
    a foreign-matter infiltration suppressing structure configured to include a groove-shaped first fitting part formed on one connected portion out of connected portions between the casing member and the base member, and a second fitting part formed on the other connected portion and being fitted into the first fitting part.

5. The mounting structure of the electronic component according to claim 1, wherein
    the first engaging part is a protrusion that protrudes toward the second engaging part, and
    the second engaging part is a hole or a recess into which the protrusion is inserted.

6. The mounting structure of the electronic component according to claim 5, further comprising:
    a foreign-matter infiltration suppressing structure configured to include a groove-shaped first fitting part formed on one connected portion out of connected portions between the casing member and the base member, and a second fitting part formed on the other connected portion and being fitted into the first fitting part.

7. The mounting structure of the electronic component according to claim 1, further comprising:
    a foreign-matter infiltration suppressing structure configured to include a groove-shaped first fitting part formed on one connected portion out of connected portions between the casing member and the base member, and a second fitting part formed on the other connected portion and being fitted into the first fitting part.

8. The mounting structure of the electronic component according to claim 1, wherein
    the casing member comprises a rectangular parallelepiped box consisting of five sides, and
    the base member is a rectangular lid directly abutting and fitted to four of the five sides while the electronic component main body is within the housing thereby surrounding all sides of the electronic component main body.

9. A mounting structure of an electronic component, comprising:
    the electronic component configured to include
        an electronic component main body,
        a housing in which the electronic component main body is mounted on any one of a plurality of structural members, and the structural members are assembled so as to form a chamber for the electronic component main body in the housing, and
        a terminal exposed from the chamber of the housing to outside of the housing while maintaining an electrical connection state between the terminal and the electronic component main body;
    a housing member configured to include a housing space for the electronic component, the housing space including a housing chamber that accommodates the housing, and a terminal chamber that accommodates a terminal of the electronic component;
    a counterpart terminal configured to be fitted into the terminal chamber and electrically coupled to the terminal in association with accommodation of the electronic component into the housing space; and
    at least one locking mechanism configured to maintain an accommodation state of the electronic component with respect to the housing member, the electronic component being accommodated in the housing member by engaging a first engaging part provided to the structural member to which the electronic component main body is attached and a second engaging part provided to the housing member one another, wherein the housing is configured to surround all sides of the electronic component main body.

10. A mounting structure of an electronic component, comprising:

the electronic component configured to include
an electronic component main body,
a housing formed by assembling a casing member in which a chamber for the electronic component main body is formed and a base member to which the electronic component main body is attached, and
a terminal exposed from the chamber to outside of the housing while maintaining an electrical connection state between the terminal and the electronic component main body;
a housing member configured to include a housing space for the electronic component, the housing space including a housing chamber that accommodates the housing, and a terminal chamber that accommodates a terminal of the electronic component;
a counterpart terminal configured to be fitted into the terminal chamber and electrically coupled to the terminal in association with accommodation of the electronic component into the housing space;
at least one locking mechanism configured to maintain an accommodation state of the electronic component with respect to the housing member, the electronic component being accommodated in the housing member by engaging a first engaging part provided to the base member and a second engaging part provided to the housing member one another; and
a foreign-matter infiltration suppressing structure configured to include a groove-shaped first fitting part formed on one connected portion out of connected portions between the casing member and the base member, and a second fitting part formed on the other connected portion and being fitted into the first fitting part.

* * * * *